United States Patent [19]

Carlisle et al.

[11] Patent Number: 5,314,293
[45] Date of Patent: * May 24, 1994

[54] DIRECT DRIVE ROBOTIC SYSTEM

[75] Inventors: Brian R. Carlisle, Palo Alto; Carl R. Witham, Dublin; Donald R. Allan, Menlo Park; John W. Meadows, Los Altos Hills, all of Calif.

[73] Assignee: Adept Technology, Inc., San Jose, Calif.

[*] Notice: The portion of the term of this patent subsequent to Oct. 27, 2004 has been disclaimed.

[21] Appl. No.: 941,859

[22] Filed: Sep. 8, 1992

Related U.S. Application Data

[63] Continuation of Ser. No. 930,214, Nov. 12, 1986, abandoned, which is a continuation of Ser. No. 694,585, Jan. 24, 1985, Pat. No. 4,702,668.

[51] Int. Cl.⁵ .............................................. B25J 17/00
[52] U.S. Cl. .................... 414/744.5; 414/744.3; 901/15; 901/21; 901/23; 901/25; 901/29; 74/479 BP; 74/479 BF
[58] Field of Search ............... 414/744.3, 744.5, 744.7; 901/9, 15, 21, 23, 24, 25, 29; 74/96, 216.3, 479 BP, 479 BF

[56] References Cited

U.S. PATENT DOCUMENTS

| | | | |
|---|---|---|---|
| 3,046,808 | 7/1962 | DeMart | 74/216.3 X |
| 4,428,710 | 1/1984 | Grisebach et al. | 417/735 X |
| 4,518,298 | 5/1985 | Yasukawa | 901/23 X |
| 4,552,505 | 11/1985 | Gorman | 901/21 X |
| 4,557,662 | 12/1985 | Terauchi et al. | 414/744.5 |
| 4,702,668 | 10/1987 | Carlisle et al. | 901/23 X |

FOREIGN PATENT DOCUMENTS

| | | | |
|---|---|---|---|
| 2851958 | 6/1979 | Fed. Rep. of Germany | 901/26 |
| 112789 | 2/1979 | Japan | 901/17 |

*Primary Examiner*—Michael S. Huppert
*Assistant Examiner*—Donald W. Underwood
*Attorney, Agent, or Firm*—Flehr, Hohbach, Test, Albritton & Herbert

[57] ABSTRACT

An articulated direct drive robotic manipulator providing rotation of first and second arms about first and second parallel axes including first and second motors for driving the rotation of the first and second arms. A pedestal is mounted on a base, the first motor is directly coupled to a rotatable column in the pedestal for providing a first robot arm with a first degree of freedom, a second motor is coupled to a rotatable column coaxial to the first column for providing the manipulator with a second degree of freedom by rotation of the second arm. The distal end of the second arm includes support for an end effector for movement about a third axis which is a vertical axis and a fourth axis which is a rotational axis and support for a quill. Also included is a modular device adapted to be coupled to the end of the quill which can move within horizontal planes passing through the third axis to provide a fifth degree of freedom.

41 Claims, 9 Drawing Sheets

FIG_1

FIG_2

FIG_3

FIG_5

FIG_6

FIG_7

FIG_8

FIG_9

FIG_10  FIG_11

FIG_12

FIG_13

DIRECT DRIVE ROBOTIC SYSTEM

This is a continuation of application Ser. No. 06/930,214 filed Nov. 12, 1986, now abandoned; which is a continuation of application Ser. No. 694,585 filed Jan. 24, 1985, now U.S. Pat. No. 4,702,668 issued Oct. 27, 1987.

The present invention is directed generally to an articulated robotic arm which includes a plurality of movable segments between its fixed base and its working hand or end effector, and more particularly to such a manipulator utilizing direct drive motors.

Electrically power robots such as are presently in use typically incorporate complex mechanical transmission systems such as gear trains, lead screws, steel belts, chains, and linkages which are used to transmit power from the motors to the load and to increase the driving torque. However, such transmission mechanisms cause many problems including large friction and backlash at the transmission; heavy weight and/or high compliance of the transmission; and frequently, additional complicated mechanisms for minimizing the backlash. To the extent that such transmission systems can be eliminated, the design of the robot can be greatly simplified, and its accuracy in locating the end effector over a workpiece can be significantly increased.

Therefore, it is an objective of the present invention to provide a robot system in which the transmission systems are reduced or eliminated. To the extent that such transmission systems with arm links directly coupled or coupled by very simple drive mechanisms to motor rotors can be achieved, excellent performance will be provided in terms of reduced backlash, reduced friction, lowered inertia, lowered compliance and high reliability. All of these are necessary factors in high-speed, high-precision robots.

A second difficulty in designing any direct drive robot is that to the extent the motors are incorporated in the moving arms, the motors to drive wrist joints become loads which must be moved by motors driving elbow joints, and these motors in turn are loads for motors located at the shoulders.

Therefore, it is an objective of the present invention to consolidate the driving motors at the central pedestal which mounts the arms of the robot manipulator, thereby minimizing the weight of the arms, elbows and shoulders which must be moved.

In a typical robot of a type previously disclosed, for example, in U.S. Pat. No. 4,283,764 (Crum), each of the joints between segments includes an actuator with a gear mounted on the output shaft for driving rotation of the joint. Obviously, a manipulator such as is disclosed in that patent is quite massive, and difficult to position accurately.

In other known types of robots, each joint includes a member which is positioned closer to the fixed base called a driving member, and provided with an electric motor with a gear mounted on the output shaft, and a driven member positioned closer to the distal end of the arm and provided with a second gear of larger diameter. The driven member is operated by the motor through the gears for speed reduction. Again, such a manipulator has all the faults associated with robots incorporating a plurality of transmissions. Other manipulators or robots are also known in which each joint between segments includes a hydraulic cylinder connecting a segment or member positioned closer to the fixed base to the driven member. Such robots, however, in addition to being bulky and heavy, are troubled with oil leaks and the like, which can result in reduced control accuracy.

One prior effort in the field of directly driven mechanical arms is disclosed in U.S. Pat. No. 4,425,818 (Asada) and an article entitled *Design of Direct Drive Mechanical Arms* by H. Asada and T. Kanade of the Robotics Institute of Carnegie Melon University (Code Number CMU-R12-TR-81-1). However, the robot disclosed therein is a design in which motors are bolted directly on output shafts, on all axes. This results in an extremely heavy and bulky design. The design described herein is more compact and able to achieve high accelerations because the drives for both the first and second axes are coaxially located in the base pedestal, thus minimizing the mass of moving links.

It is a further objective of the present invention to accomplish this wide range of motion in a system using relatively larger and higher powered motors mounted parallel to a first axis of movement in order to consolidate the major elements of the weight in the main pedestal, while using only small motors to add the further degrees of freedom and ranges of motion in the articulated arm links.

These and other objectives of the present invention are achieved in a robot which includes a pedestal having two motors which rotate around a common axis to directly drive rotation of first and of second linking arms which are rotating in a plane perpendicular to this pedestal. The first, inner link is preferably driven through a column directly driven by a first motor rotor, the column supporting the inner end of the link. The second, outer link is driven by the second coaxial direct drive motor through a simple, highly-tensioned belt and pulley arrangement. As a result of this direct drive arrangement, movement is provided about two separate parallel axes by two arms arranged perpendicular to the first axis which mounts the two major driving motors of the robot. These two arms are linked together between this major pedestal and the end effector of the robot, centralizing the driving motors at the main stabilizing pedestal, while providing rapid rotational movement around each of the two axes. The first axis is defined by the major pedestal, the second axis is defined by the junction between the inner and outer linking arms which connect the pedestal to the end effector. The robot of the present invention is free of or has substantially reduced power loss, backlash, and other problems which are typically encountered in the transmission mechanisms of known robots.

A further achievement of the present invention is to provide the final vertical positioning of the end effector along a third axis as well as rotational movement of the end effector around that same third axis by the use of small sized motors. The first of these motors can be mounted near the junction between the two linking arms and coupled through a driving belt to the housing for the quill which carries the end effector. In this way, this motor, which can be of relatively small size, is located as near as possible to the central pedestal, while still directly connected to the quill without elaborate chains or gears. The motor used to provide the vertical motion of the quill can be directly mounted in the quill housing with the stator surrounding the quill, and the rotor carried on the housing for the drive nut for the quill. By utilizing a drive nut and sequence of drive balls moving within the threads of the drive nut, the quill can be rapidly and accurately driven along the third vertical axis. This combination also allows for accurate compensation between the rotational movement of the quill and the vertical movement of the quill so that vertical positioning does not affect the desired rotational rate of the quill, and vice versa.

Other objects and advantages of the present invention will become apparent from the following description which is given in conjunction with the accompanying drawings. However, it should be understood that the embodiment disclosed herein is only of a preferred embodiment of the invention as now designed and the scope of the present invention is to be limited only by the following claims.

Figure 1:
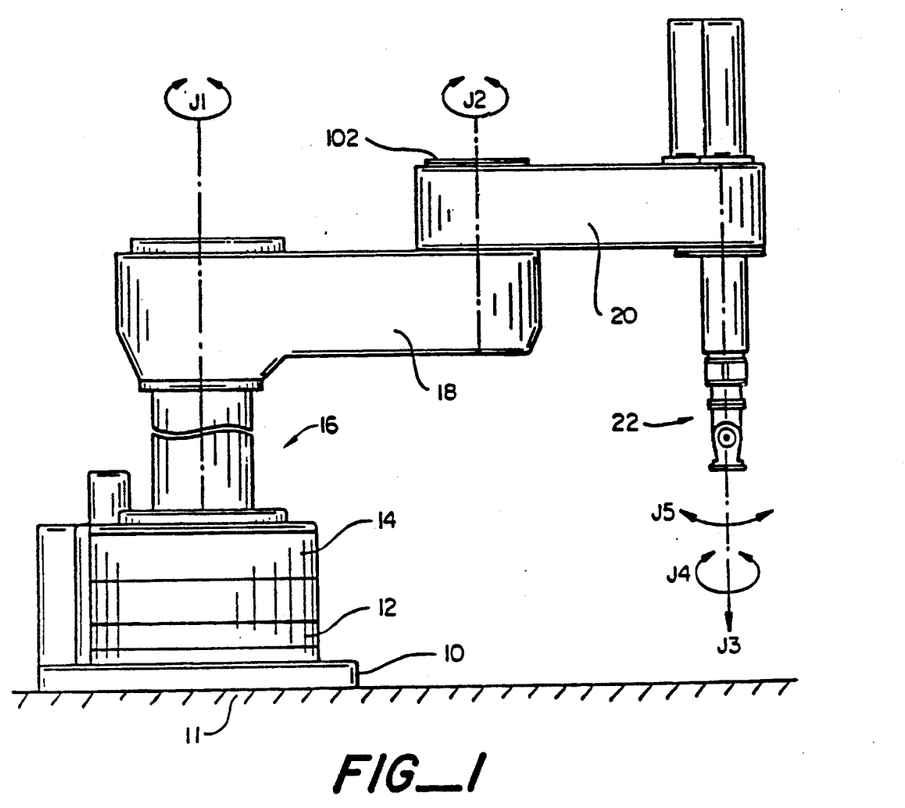
FIG. 1 is a front elevational view of the robot of the present invention.

Referring first to FIG. 1, the preferred embodiment of the present invention includes a base 10 coupled to the ground 11 supporting two coaxially aligned variable reluctance motors 12, 14. Drive columns 40 and 56 and center support column 54 which will be, shown in detail in FIG. 3 extend through the column shaped pedestal 16 to the inner linking arm 18 and outer linking arm 20. These two motors provide rotation about axis J1 which coincides with the common axis of the two motors 12 14, and axis J2 which is located at the joint between the inner and outer linking arms 18, 20. The end effector 22 is carried at the end of the outer link 20 and can be raised and lowered along the axis J3. This is accomplished using a mechanism described with respect to FIGS. 7 through 9. The end effector 22 can also be rotated J4 about this same axis using a motor and band drive connector shown in FIGS. 6 and 7. An additional degree of freedom J5 can be achieved with the modular attachment shown in FIGS. 10 through 13.

Figure 2:
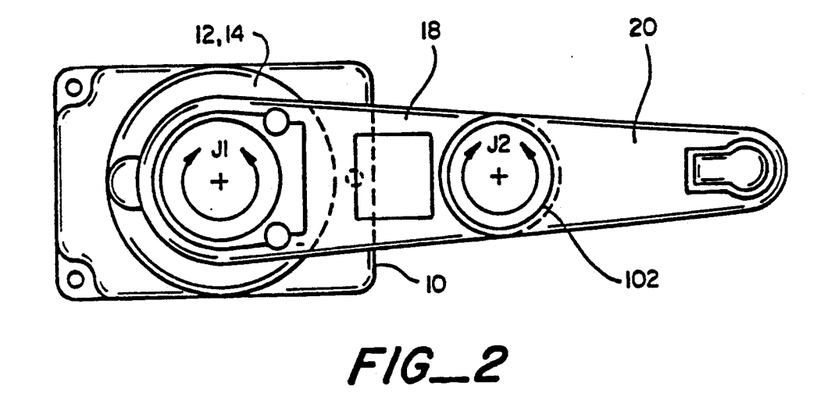
FIG. 2 is a top view of the robot of the present invention as shown in FIG. 1.

FIG. 2 clearly shows the coaxial relationship of the first two drive motors 12 and 14 which are centered on the first axis of rotation J1. The means for conveying the output of these two motors to the link arms 18, 20 will be described, making reference to FIGS. 3–6.

Figure 3:
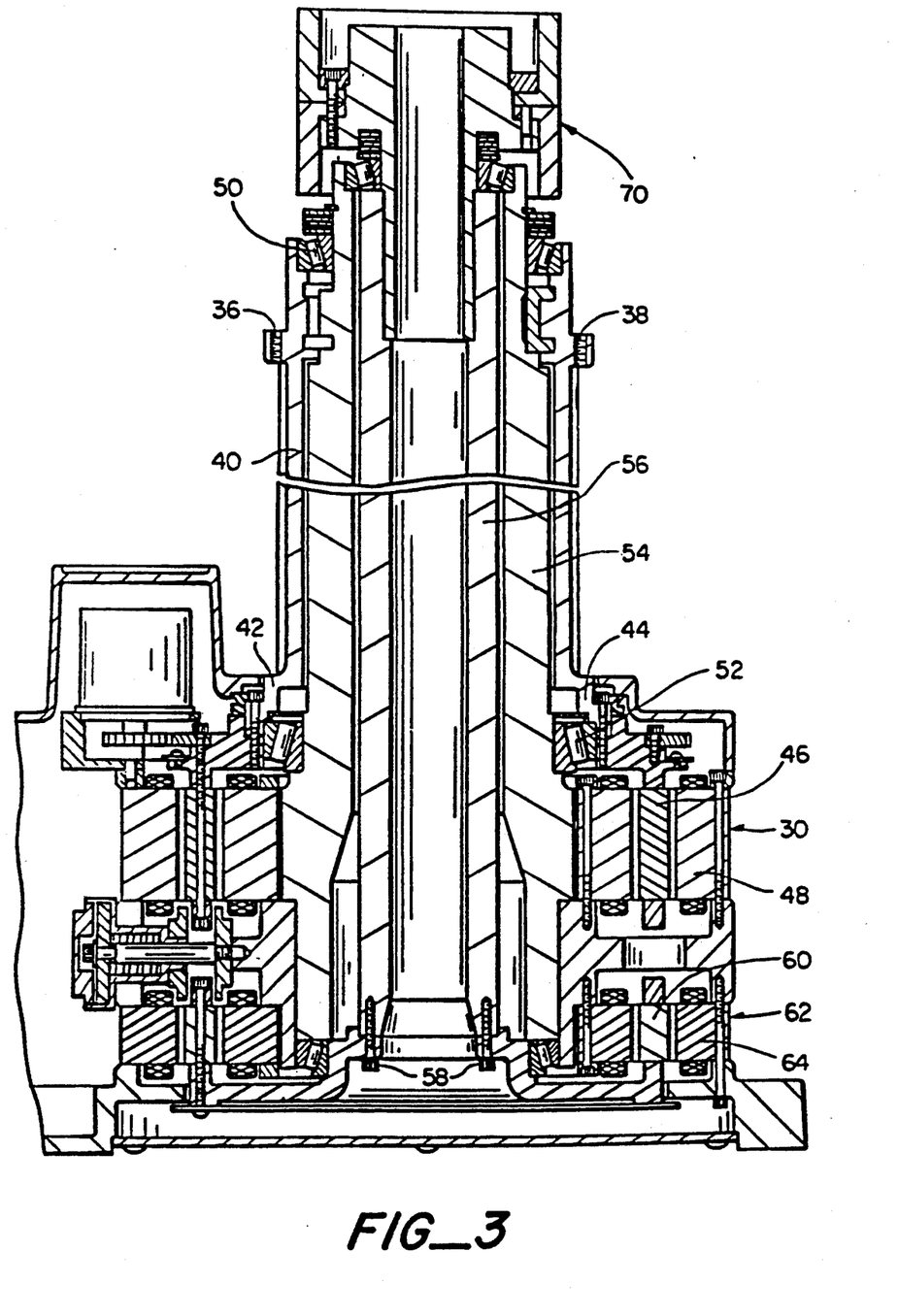
FIG. 3 is an enlarged vertical sectional view of the pedestal of the robot of FIG. 1, showing the coaxially aligned direct drive motors and the drive means for the linking arms.
Figure 4:
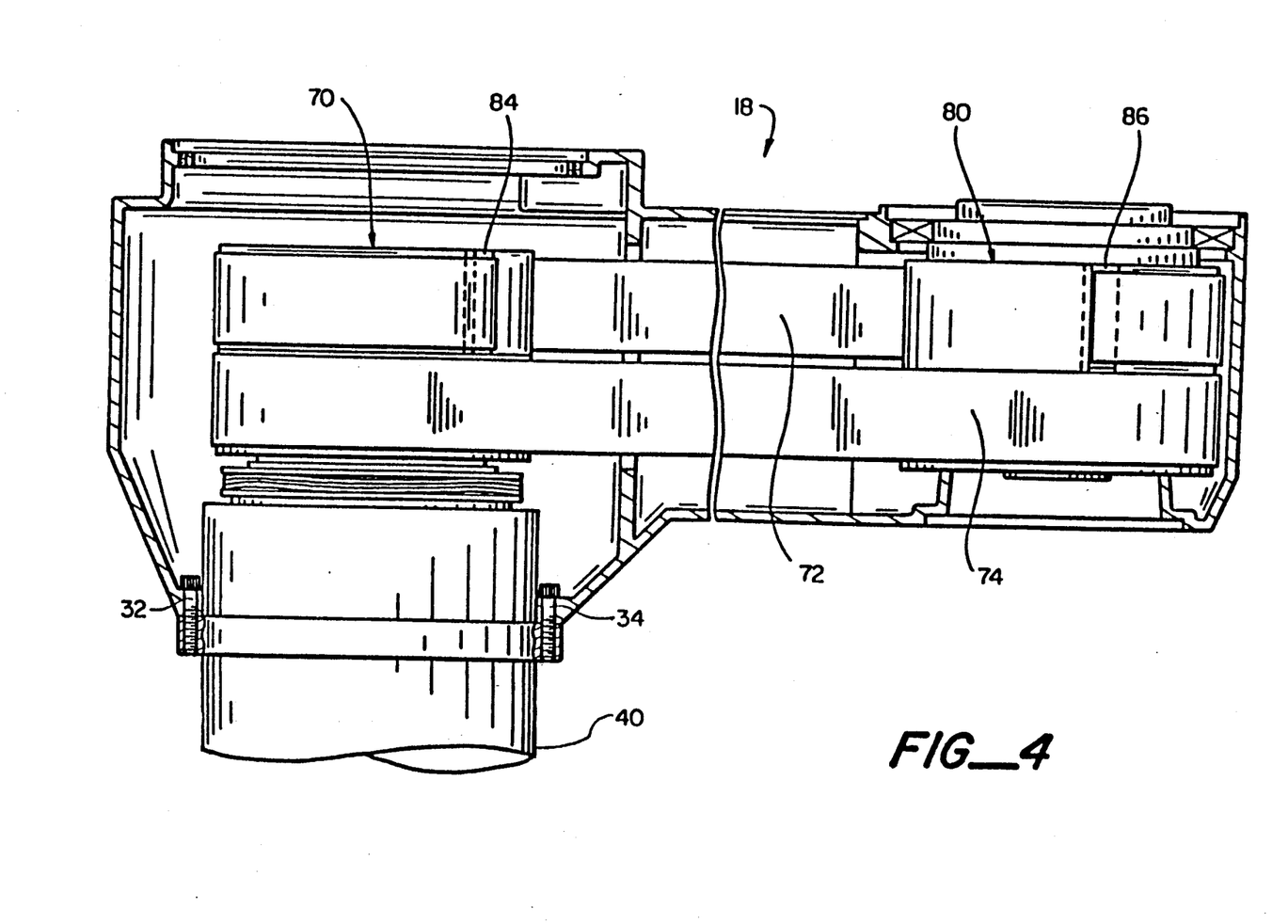
FIG. 4 is a vertical sectional view of the portion of the first linking arm which is joined to the top of the pedestal and extends to the junction with the second linking arm.
Figure 5:
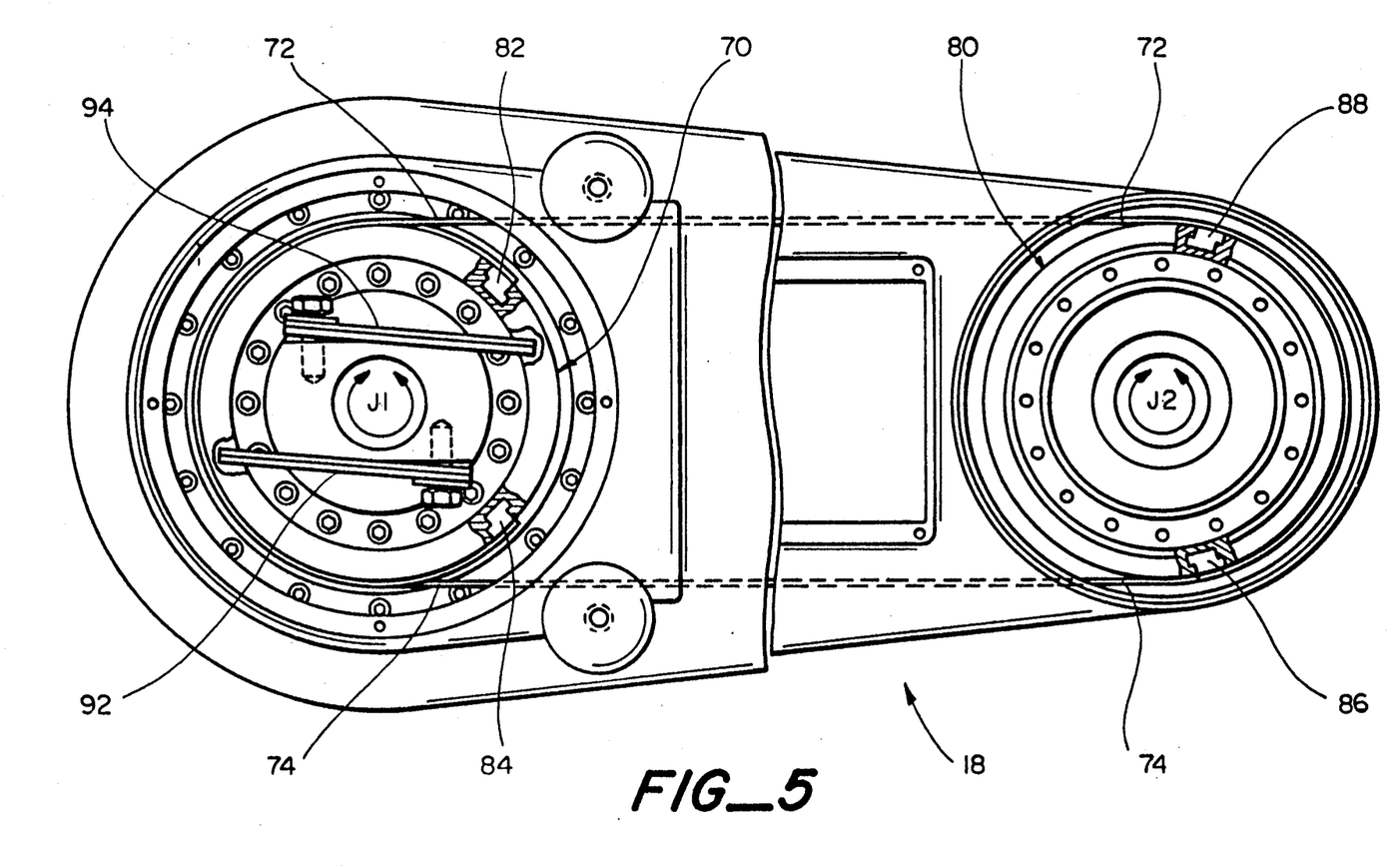
FIG. 5 is a horizontal sectional view of the inner linking arm of FIG. 4, especially showing the means for conveying the rotation of the pedestal-located drive motor to the junction with the second linking arm.

It is apparent from an inspection of FIG. 3 that it is the topmost motor 30 which rotates the inner link 18 about axis J1. The inner link 18 is attached to the rotatable column 40 using screws 32, 34 which will fit onto screwholes 36, 38 in the top of the rotatable column 40. Column is joined through screws in shoulders 42, 44 to the rotor 46 of motor 30. The stator 48 is controllably energized through a power amplifier which is described in detail in U.S. Pat. No. 4,625,158, filed on the same date as this application in the name of ion Taenzer. Rotation of the column 40 carries with it the inner linking arm 18, causing rotation of this arm and ultimately the end effector of the robot about the axis J1. Column 40 is supported for rotation by bearings 50, 52 at the top and bottom of the column.

The center column 54 comprises the fixed support of the pedestal which mounts the motors and linking arms of this robot. Column 56 rotates inside this fixed column. Column 56, which will drive the outer linking arm 20, is coupled through screws 58 to the rotor 60 of the lower motor 62. The stator of this motor 64 is selectively energized by a duplicate of the power amplifier incorporated by reference above. It can be seen that the top of this column 56 is permanently joined to a two-section drum 70 at the top of the pedestal. (It should be noted that the left and right sides of FIG. 3 are not symmetrical in certain areas because many of the screws which are used to fasten the sections of the pedestal together are located at 120° angles rather than at 180° angles so that a direct vertical section does not show all of the same screws on both sides of the pedestal, nor the same screws being used to join together both sections of the drum.) The drum carries a two-section band 72, 74. Each section of the band describes a portion of a complete loop around the upper drum 70 at the top of the pedestal and drum 80 at the end of the inner linking arm. The reason for this design is to provide a belt which can be put in place under the maximum possible tension with the two sections of the belt effectively pulling against each other to maintain the tension on the opposite sections of the belt.

The band section 72, 74 have "s" shaped clips welded to each end which will mate with the appropriate opening 80, 82, 84, 86 in the upper and lower sections of the drums 70, 80. Leaf-type springs 92, 94 are screwed into one section of the drum 70 at an angle so that they fit into an opening cut in the other section of the drum. Thus, after the first band or lower band section 74 is put in place around the two drums, and the upper section is also put in place, then these springs can be tightened to maximize the tension against the band sections. It is also apparent from a study of FIG. 4, that each band section is wrapped around so that both ends of a band section are pinned to the same side of the two drums. Thus, each band section must be long enough to wrap around about one-half of the outer circumference of the appropriate drum section so that as the drum 70 is driven by the motor at axis J1, the bands can wind and unwind on drum 80 to drive the drum at axis J2.

Figure 6:
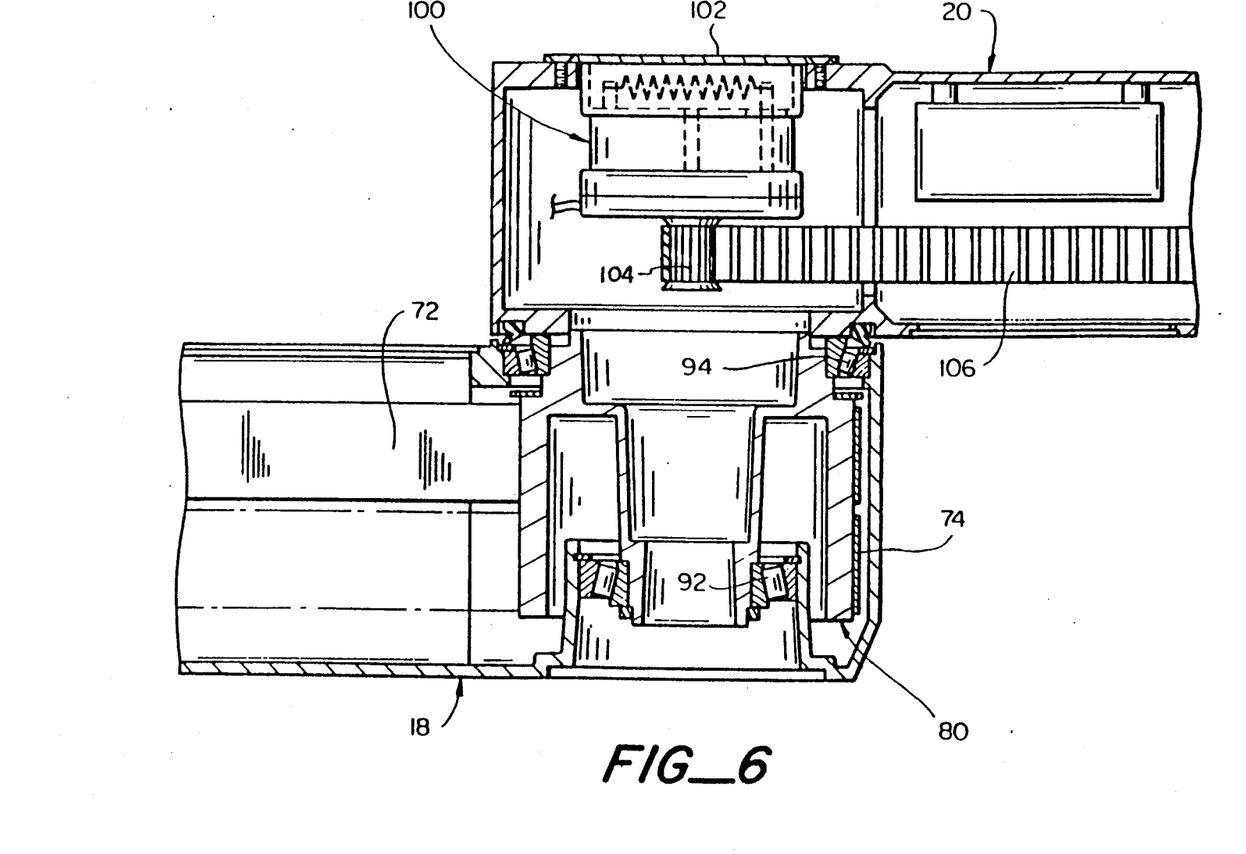
FIG. 6 is vertical sectional view of the junction between the inner and outer linking arm showing the relationship of the two arms as well as the location of the motor which drives a quill carrying the hand or end effector of the present invention.

FIG. 6 is a sectional view of the junction between the lower link 18 and upper link 20. It shows the drum 80, and band sections 72, 74 which drive drum 80. The upper link 20 mates with the end of the lower link 18 so that rotation of the drum 80 directly drives the upper linking arm 20 to provide rotation of the end effector or hand of the robot about the axis J2. This rotational mount is provided on bearings 92, 94 which support this drum and mounting for rotation about the axis J2.

A small direct drive motor 100 is provided on the outer linking arm 20 to drive rotation of the quill. As can be seen in FIG. 1, a hatch or opening 102 is provided in the top of linking arm 20 so that the motor can be easily inserted. The motor drives a pulley 104, and thereby a belt 106 which is connected to the housing of the quill which carries the end effector.

Figure 7:
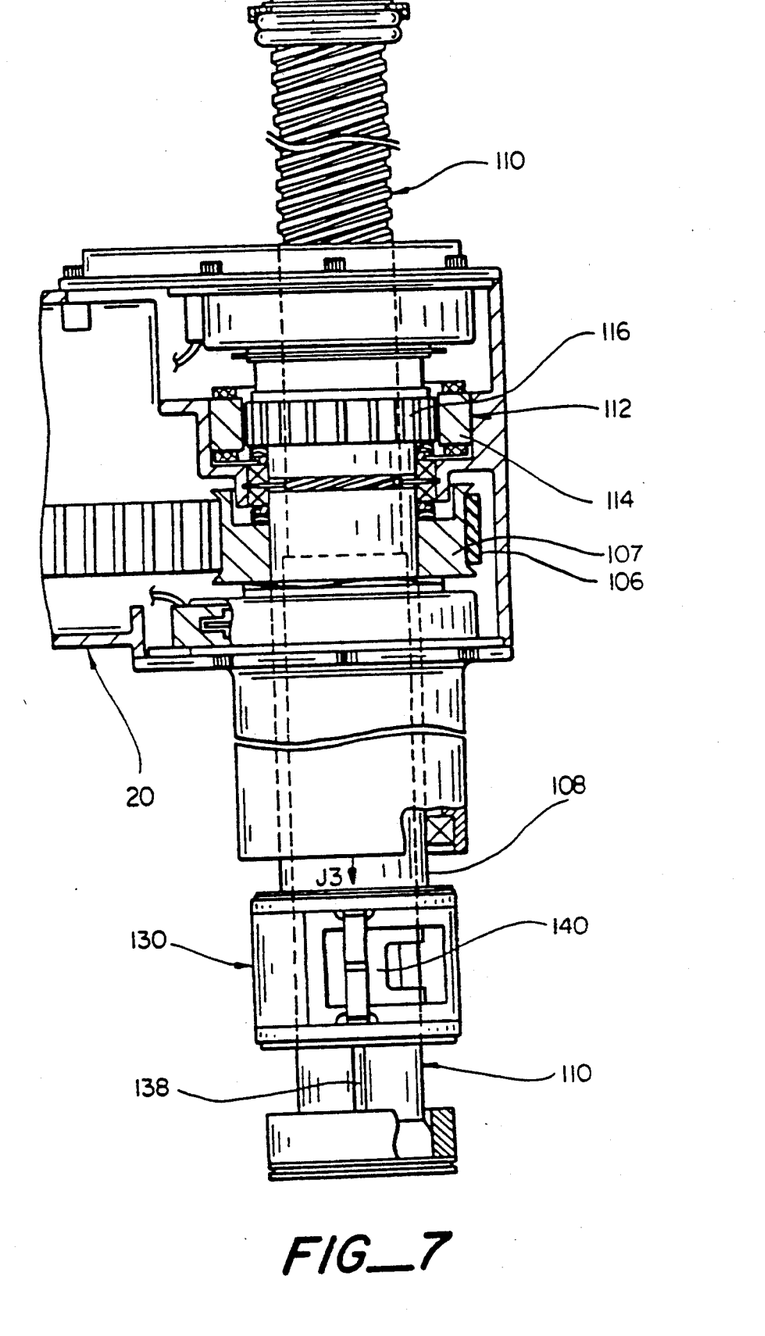
FIG. 7 is a vertical sectional view of the end of the outer linking arm, the housing for the quill which carries the end effector, the motor which drives the quill vertically along the third axis and the coupling between the belt which drives the rotation of the quill and the quill itself.
Figure 8:
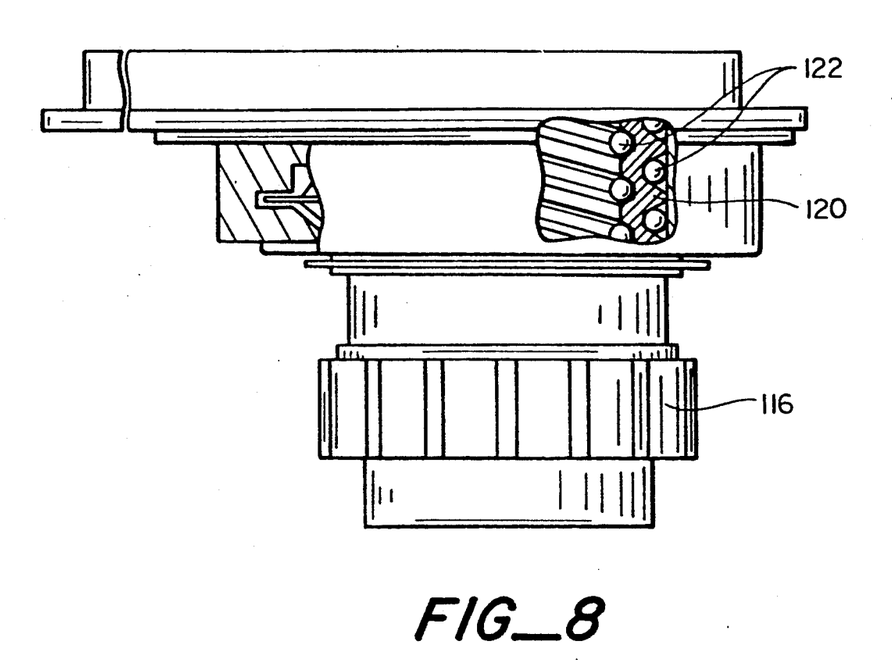
FIG. 8 is an expanded sectional view of the motor which is used to change the elevation of the quill and the drive nut which translates this rotational motion into vertical motion of the quill.

This housing and quill which are driven by belt 106 are shown in detail in FIG. 7. The housing is indicated by reference 108, and the quill by reference 110. The upper portion of the quill is threaded by four threads which do not connect with one another. These threads can be used to drive the quill 110 vertically in response to motion of the motor 112. This is a simple direct drive motor controlled by an amplifier of a type disclosed in the U.S. Pat. of Jon Taenzer, U.S. Pat. No. 4,746,843 filed concurrently with this application and incorporated herein by reference. The motor includes a stator 114 incorporated in the end of the linking arm 20 and more specifically in the housing of the vertically movable quill, and a rotor 116 which rotates in response to energization of the motor. The rotor 116 is press fitted on the outside of a drive nut shown in sectional detail in FIG. 8. As can be seen, the threads of the quill 110 and the interior grooves of the drive nut 120 which is directly driven by the rotor 116 are filled with a string of balls 122. As the drive nut rotates, the balls are carried up through the threads on the exterior of the quill, captured between the threads on the quill and the internal grooves on the drive nut. When the balls reach the top of the drive nut, they pass through an opening to the outside of the drive nut and return to the bottom of the nut on a reverse thread on the outside of the nut. In this way, as the drive nut rotates in a fixed position relative to the linking arm, the quill is smoothly carried up and down along the vertical axis J3, directly driven by the signals applied to the motor 112. Thus, the necessary size and weight of the motor is minimized, as well as the mechanical connections between the motor and quill. This direct drive eliminates complicated gearing mechanisms which would ordinarily be necessary to translate the motion of the motor to the vertical motion of a quill. This drive nut also constitutes the upper bearing support for the motor.

Figure 9:
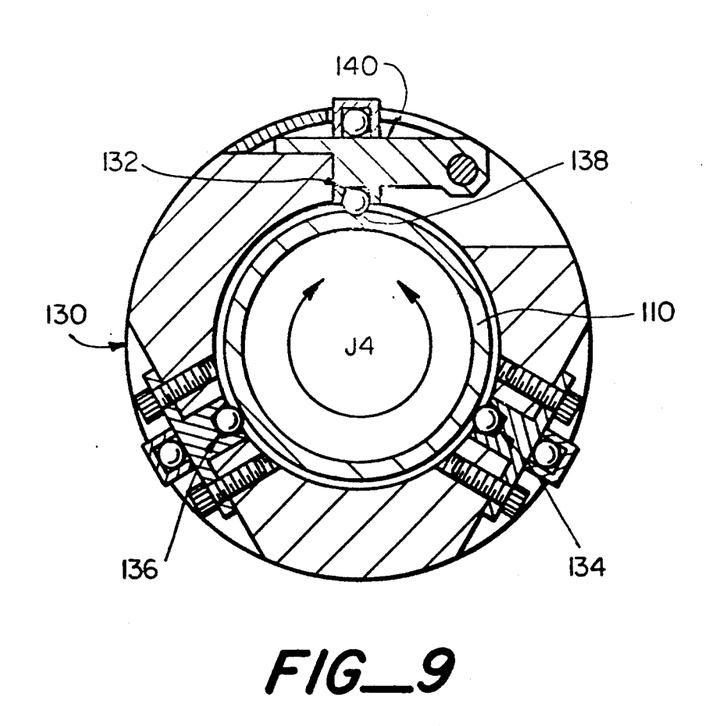
FIG. 9 is a sectional view of the lower coupling between the housing for the quill and the quill itself showing the bearings which support the quill and convey rotational motion to the quill.

The lower bearing support is provided in a housing 130, a sectional view of which is shown in FIG. 9. FIG. 9 shows three lines of ball bearings 132, 134, 136 resting against the sides of the quill which in this portion has a smooth surface with only a single groove 138 cut into the surface. Thus, as the quill moves up and down, the lines of ball bearings 132, 134, 136 support the quill for smooth up and down movement. Moreover, as the belt 106 rotates, the housing 108 also rotates housing 130. This rotational motion is conveyed to the quill by the action of the tightly fitted bearings 132 in the groove 138 on the surface of the quill. Should the quill or the end effector of the quill or hand of the robot meet unexpected or unprogrammed resistance, then the release mechanism 140 operates causing the quill to be released from being carried by the line of balls 132 so that now the holder 130 rotates freely past the surface of the quill for a short distance. In this way, if a sudden obstruction should be met, no damage to the quill occurs. The quill can be reset in its proper position relative to the holder 130 by hand.

Figure 10:
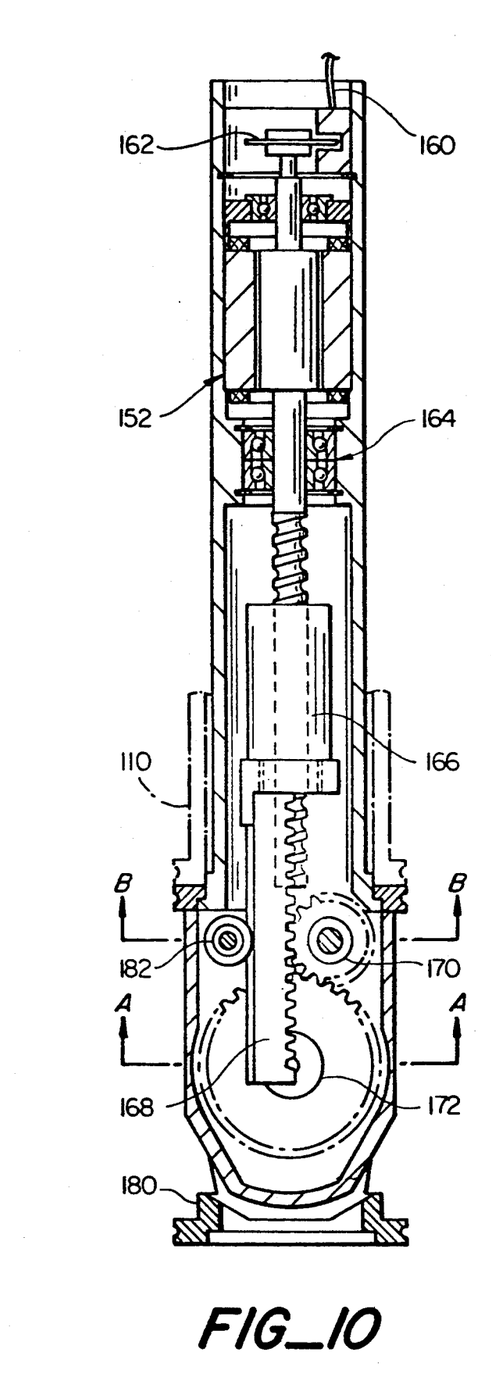
FIG. 10 is a sectional view of a modular attachment to the quill to impart a third degree of freedom to the range of motion of the end of the quill.
Figure 11:
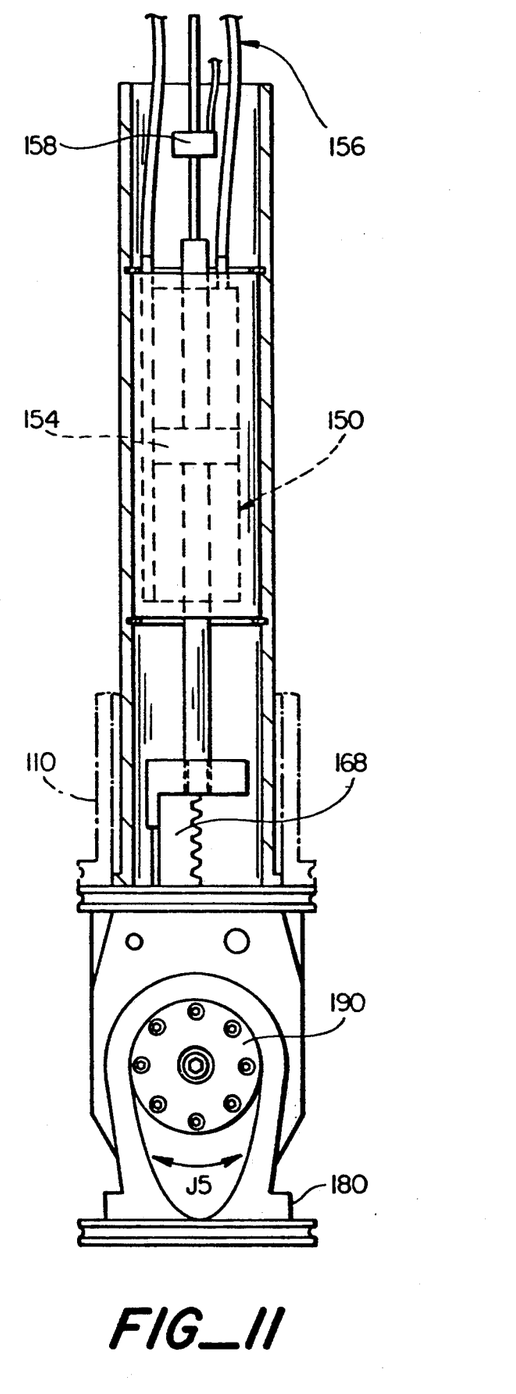
FIG. 11 is a side elevational view of the added fifth joint shown in sectional view in FIG. 10, illustrating in a sectional portion of a different drive means than shown in FIG. 10.

In an especially useful embodiment of the invention, a further degree of freedom can be provided for the end effector. This is accomplished by coupling to the end effector a modular fifth axis device shown in FIGS. 10 through 13. The power source for this module fits up inside the hollow barrel of the quill as shown in FIGS. 10 and 11. Under the action of this power source, which drives the rack 168, rotation through any horizontal plane which contains the vertical axis of the quill on which this end effector is inserted can be accomplished. Two embodiments of this added module are shown; the embodiment of FIG. 11 uses an air cylinder 150 as the power source, while the embodiment of FIG. 10 uses an electric motor 152. The air cylinder 150 incorporates a piston 154 connected through air hoses generally shown at 156 to valves which control the position or rotation of the module. A linear encoder 158 on the support shaft provides position feedback.

In the electric motor embodiment of FIG. 10, the motor 152 receives its control signals through wires indicated generally at 160 from a control microprocessor. An encoder 162 on the rotating shaft of the motor provides positional feedback. The motor output is conducted through angular contact thrust bearings 164 through a ball screw and nut 166 to a rack 168. The rack drives an idler gear 170 which in turn drives an output gear 172. As shown in FIG. 11 and more clearly in the sectional view of FIG. 13, this output gear 172 is connected to an output yoke 180 which is shown both in FIGS. 11 and 13. The rack is maintained in its position relative to the qears by the idler gear 170 and a backup roller 182 which in a preferred embodiment are both mounted on eccentric shafts. As the rack 168 is driven vertically, its output motion is converted to rotational motion of the output flange on the end of the yoke 180 by the idler gear 170 and output qear 172.

Figure 12:
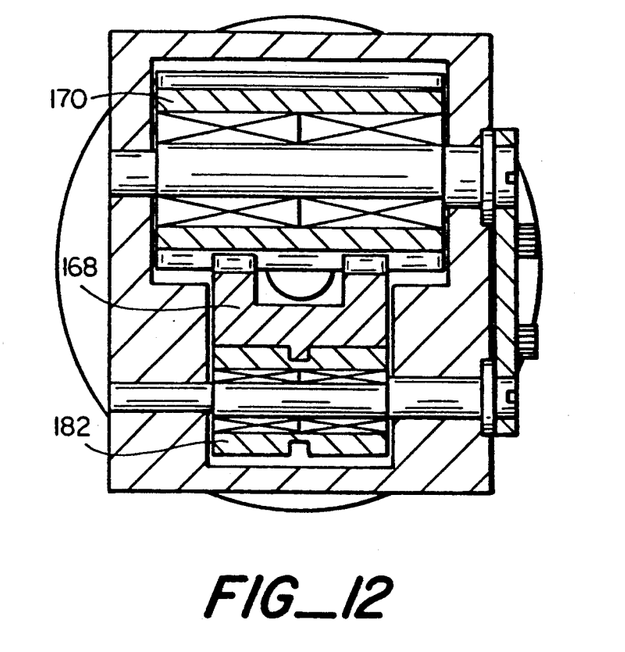
FIGS. 12 and 13 are sectional views through the added joint of FIG. 10 showing the relationship between the parts which translate the vertical motion of the drive means and rack to horizontal motion, FIG. 12 being taken along the line B—B of FIG. 10, and FIG. 13 being taken along A—A of FIG. 10.

FIG. 12 shows the relationship between the rack 168, the backup roller 182, and the idler gear 170. The eccentric shaft mounting of the two gears 170, 182 becomes apparent in this drawing. The relationship of these three parts is essential to allow the rack to pass freely in and out of the module without interfering with the rotational movement of the output flange.

Figure 13:
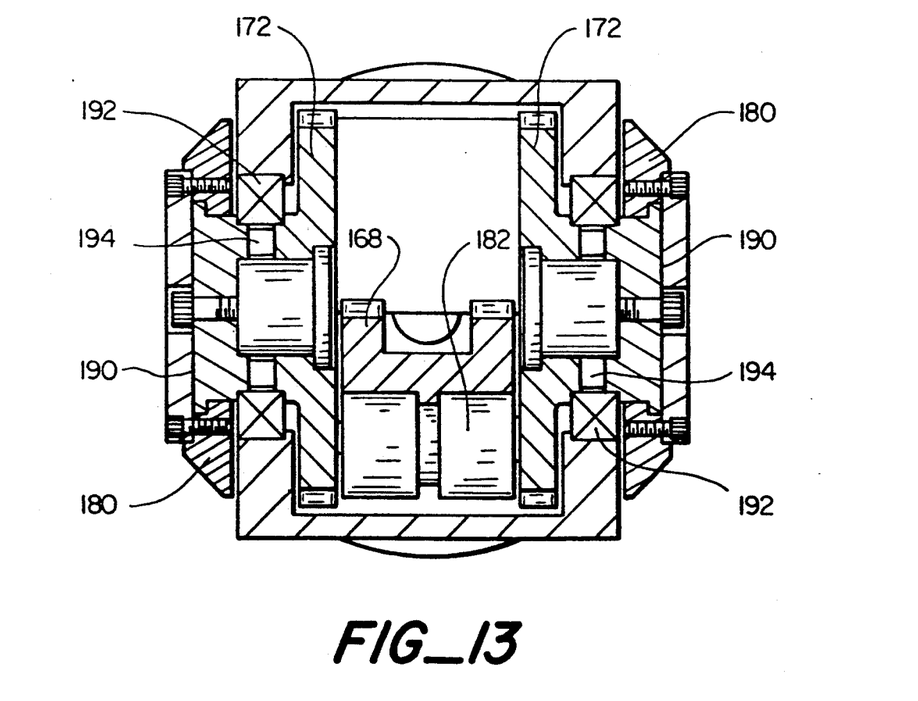

FIG. 13 more clearly shows the coupling between the rack 168, the output gears 172, and the yoke 180 which is held in place against the output gear by friction clamps 190. Appropriate ball bearings are also provided 192 to allow for the rotation of the yoke with the output qears. Drive dogs 194 are provided to couple the gears and yoke.

In summary, the present invention provides rotation about three separate axes, vertical movement along the outermost of the axes, and an additional rotational movement in planes parallel to the outermost axis. As a result, the end effector or hand of the robot of this invention may be very quickly and accurately positioned. The concentration of the major driving motors at the central pedestal provides a balanced, high-speed system. The smaller motors, with only one exception, are concentric with the axis on which they are working, minimizing the need for coupling drives and gears.

Modifications of the present invention may become apparent to a person of skill in the art who studies the subject invention disclosure. Therefore, the present invention is to be limited in scope only by the following claims.

What is claimed:

1. An articulated direct drive robotic manipulator providing rotation about first and second parallel axes comprising first and second motors rotating about a common axis which is in common with the first axis of rotation of the manipulator, the first motor including a rotor directly coupled to a driver member rotating about said first of rotation, the manipulator including a first arm mounted to said driver member for movement in a plane perpendicular to the first axis about a joint centered at said first axis, the end of said first arm distal from the first axis including a joint rotatable about said second axis, said second motor including a rotor rotating about the first axis and coupled to said second axis joint to rotate said joint.

2. A robotic manipulator as claimed in claim 1 including a pedestal coaxial with the first axis, the base of shid pedestal including said first motor.

3. A robotic manipulator as claimed in claim 1 including a column directly driven by the rotor of said first motor to rotate said first arm of said manipulator about said first joint, said column comprising said driver member.

4. A robotic manipulator as claimed in claim 3 wherein said first arm is directly connected to the column driven by said first motor for rotation in a plane perpendicular to the first axis.

5. A robotic manipulator as claimed in claim 2 wherein said second motor is located at the base of said pedestal adjacent said first motor, the rotor of said second motor being directly coupled at the first joint between said pedestal and said first arm to means for translating motion of said second motor rotor to said second axis joint.

6. A robotic manipulator as claimed in claim 5 wherein said motion translating means comprise a pair of drums and a band movable with said drums, one of said drums being mounted coaxially with said first and second motors at said first axis and directly driven by said second motor, the other of said pair of drums being mounted coaxial with said second axis, said manipulator including an outer linking arm whose inner end is directly coupled to and driven by said second drum.

7. A robotic manipulator as claimed in claim 6 wherein said band comprises two sections, each section comprising more than one-half of a complete band loop, each section being fastened to the side of one of said drums.

8. A robotic manipulator as claimed in claim 7 wherein each of said belt sections is of sufficient length to extend about one-half the circumference of each drum, the belt section ends being fastened to said corresponding positions on the sides of said drums.

9. A robotic manipulator as claimed in claim 6 wherein the distal end of said outer linking arm includes a movable quill mounted on a third joint providing movement of said quill along a vertical third axis, and a fourth joint providing rotational movement of said quill around said third axis.

10. A robotic manipulator as claimed in claim 9 wherein the distal end of the outer linking arm includes a housing mounting said quill, said housing including the stator of a third motor, the rotor being mounted coaxially with said third axis, and means coupling said rotor and said quill, rotation of said rotor causing vertical movement of said third joint and said quill along said vertical third axis.

11. A robotic manipulator as claimed in claim 10 wherein said coupling means comprise a plurality of tracks threaded on the outside of said quill, an internally threaded drive nut surrounding a portion of the quill and rotating with the rotor, and a plurality of balls captured between the nut and the quill for translating rotation of said nut into vertical movement of the quill.

12. A robotic manipulator as claimed in claim 11 wherein said drive nut includes external threads on the outside of said nut and inside of said housing, said balls traveling through said internal and external threads.

13. A robotic manipulator as claimed in claim 10 including drive means for causing said fourth joint to rotate about said third axis comprising a motor mounted near to the second axis of rotation, a pulley coupled to and surrounding said quill, and a belt coupling said motor and pulley.

14. A robotic manipulator as claimed in claim 10 including means coupled to the end of said quill to provide motion of the end of said manipulator through a horizontal plane passing through said third axis of rotation.

15. An articulated robot arm, said arm having a mechanical end effector at one extremity thereof for manipulating a workpiece, said robot arm comprising
a base,
a pedestal mounted on said base, a column extending through said pedestal for rotary movement about a first fixed axis to provide said robot arm with a first degree of freedom,
a first motor directly coupled to said column in said pedestal for selectively rotating said column and said effector about said first vertical axis,
a first linking arm mounted at its inner end to said column and directly driven by said column,
a second linking arm pivotally coupled for rotation about a second vertical axis at its inner end to the outer end of said first linking arm and carrying said end effector at its outer end, to provide a second degree of freedom of motion thereto,
a second motor mounted for rotation coaxially with said first motor, said first linking arm including means for directly coupling the output of said second motor to the outer end thereof for rotating the inner end of said second linking arm and said end effector about said second axis.

16. An articulated robot arm as claimed in claim 15 wherein the outer end of said second linkage arm includes means for supporting said end effector for movement along and about a vertical third axis, said supporting means comprising a quill, a holder for said quill, means for moving said quill along and about the third axis parallel to said first and second axes, to provide third and fourth degrees of freedom to said end effector.

17. An articulated robot arm as claimed in claim 16 including a modular device adapted to be coupled to the end of said quill and comprising means for moving said end effector in horizontal planes perpendicular to said third vertical axis to provide a fifth degree of freedom to said end effector.

18. An articulated robot arm as claimed in claim 16 wherein said supporting means for said quill further comprise means coupled between said holder and said quill for rotating said quill about said third axis.

19. An articulated robot arm as claimed in claim 15 further comprising a second axis joint coupling said first linking arm to said second linking arm and coincident with said second axis, wherein said second motor is located at the base of said pedestal adjacent to said first motor, the rotor of said second motor being directly coupled at the first joint to means for translating motion of said second motor to said second axis joint.

20. An articulated robot arm as claimed in claim 19 wherein said motion translating means comprise a pair of drums and a band movable with said drums, one of said drums being mounted coaxially with said first and second motors at said first axis and directly driven by said second motor, the other of said pair of drums being mounted coaxial with said second axis, said manipulator including said second linking arm whose inner end is directly coupled to and driven by said second drum.

21. An articulated robot arm as claimed in claim 20 wherein said band comprises two sections, each section comprising more than one-half of a complete band loop, each section being fastened to the side of one of said drums.

22. An articulated robot arm as claimed in claim 21 wherein each of said belt sections is of sufficient length to extend about one-half of the circumference of each drum, the belt section ends being fastened to said corresponding positions on the sides of said drums.

23. An articulated robot arm as claimed in claim 16 wherein the distal end of the linking arm includes a holder mounting said quill, said holder including the stator of a third motor, the rotor being mounted coaxially with said third axis, and means coupling said rotor and said quill, rotation of said rotor causing vertical movement of said quill.

24. An articulated robot arm as claimed in claim 23 wherein said coupling means comprise a plurality of tracks threaded on the outside of said quill, an internally threaded drive nut surrounding a portion of the quill and rotating with the rotor, and a plurality of balls captured between the nut and the quill for translating rotation of said nut into vertical movement of the quill.

25. An articulated robot arm as claimed in claim 24 wherein said drive nut includes external threads on the outside of said nut and inside of said housing, said balls traveling through said internal and external threads.

26. An articulated robot arm as claimed in claim 23 including drive means for causing rotation about the third axis comprising a motor mounted near to the second axis of rotation, a pulley coupled to and surrounding said quill, and a belt coupling said motor and pulley.

27. An industrial robot having a plurality of controlled axes of movement, and comprising
a support member,
a first drive unit having a base component and a secondary component, said base component being rotatably mounted with respect to said secondary component to define a central axis, means fixedly mounting said secondary component of said first drive unit to said support member, output shaft means fixed to said base component and aligned coaxially with said central axis, and drive means for rotating said base component about said central axis, and
a second drive unit having a tubular base component and a secondary component, said base component being rotatably mounted with respect to its secondary component for rotation about said central axis and being coaxially disposed about said output shaft means, means fixedly mounting said secondary component of said second drive unit to said support member, tubular output means fixed to said base component of said second drive unit and aligned coaxially about said output shaft means of said first drive unit, and drive means for rotating said base component of said second drive unit about said central axis.

28. The industrial robot as defined in claim 27 wherein said drive means of each of said first and second drive units comprises an electrical motor having a rotor disposed coaxially about the central axis and being fixed to said base component thereof, and a stator disposed coaxially about the central axis and being fixed to said secondary component thereof.

29. The industrial robot as defined as claim 27 wherein said robot further comprises
an inner arm,
means interconnecting said inner arm to said output means of said second drive unit,
an outer arm,
means pivotally connecting said outer arm to said inner arm for relative rotation about a second axis disposed parallel to and laterally spaced from said central axis, and torque transmission means operatively connecting said output shaft means of said first drive unit to said outer arm,
whereby said inner arm may be pivoted about said central axis by said second drive unit, and said outer arm may be pivoted about said second axis by said first drive unit.

30. An articulated direct drive robotic manipulator providing rotation about first and second parallel axes, said robot comprising first and second motors rotating about a common axis which is in common with the first axis of rotation of the manipulator, said common axis being perpendicular to a first horizontal plane defined by a floor on which the robot stands, the manipulator including a first linking arm mounted for movement in a second horizontal plane perpendicular to the first axis about a joint centered at said first axis, said first motor including a rotor directly coupled to said first arm for controlling said movement in said first plane, the end of said first linkage arm distal from the first axis supporting a second linking arm and including a joint rotatable about said second axis, said second motor being coupled through motion translating means to said second axis joint to rotate said joint and said second arm, said motion translating means comprising a pair of drums and a band movable with said drums, one of said drums being mounted coaxially with said first and second motors at said first axis and directly driven by said second motor, the other of said pair of drums being mounted coaxial with said second axis, said second linking arm having an inner end directly coupled to and driven by said second drum for movement in a third horizontal plane parallel to said first horizontal plane.

31. A robotic manipulator as in claim 30 wherein said band comprises two sections, each section comprising more than one-half of a complete band loop, ends of each said section being fastened to separate ones of said pair of drums whereby tension can be maintained on each of said bands.

32. A robotic manipulator as in claim 31 wherein each of said belt sections is of sufficient length to extend between said pair of drums and about one-half the circumference of each said drum, the belt section ends being fastened to corresponding positions on the sides of said drums facing the same side of said robot arm whereby tension is maintained on said bands.

33. An articulated direct drive robotic manipulator providing rotation about first and second parallel axes, said robot comprising first and second motors rotating about a common axis which is in common with the first axis of rotation of the manipulator, said common axis being perpendicular to a first horizontal plane defined by a floor on which the robot stands, the manipulator including a first linking arm mounted for movement in a second horizontal plane perpendicular to the first axis about a joint centered at said first axis, said first motor including a rotor directly coupled to said first arm for controlling said movement in said first plane, the end of said first linking arm distal from the first axis supporting a second, outer linking arm and including a joint rotatable about said second axis, said second motor being coupled through said motion translating means to said second axis joint to rotate said joint and said second arm, an end of said second, outer linking arm distal from said joint between said first and second arm including a movable quill mounted on a second joint including means for providing movement of said quill along a vertical third axis perpendicular to said horizontal plane of movement of said first and second arms, and for providing rotational movement of said quill around a fourth axis, collinear to said third axis, said third and fourth axes being parallel to said first and second axes.

34. A robotic manipulator as in claim 33 wherein the distal end of said second linking arm includes means for providing movement at said second joint including a housing mounting said quill, said housing including the stator of a third motor, the rotor of said third motor being mounted coaxially with said third axis, and means coupling said rotor and said quill, rotation of said rotor causing vertical movement of said quill along said third axis.

35. A robotic manipulator as in claim 34 including drive means for causing said rotational movement about the third axis comprising a fourth motor mounted near the second axis of rotation, a pulley coupled to and surrounding said quill, and a belt coupling said motor and pulley, rotation of said motor causing rotation of said quill about said third axis.

36. A robotic manipulator as in claim 35 including means for coupling said pulley to said quill comprising a housing surrounding said quill, at least three vertical lines of balls captured between the outer surface of the quill and an inner surface of the housing, said lines of balls supporting said quill for vertical movement relative to the housing, at least one of said lines of balls being captured between a groove on the surface of the quill and the internal surface of the housing and coupling rotational movement about a third axis to said quill.

37. A robotic manipulator as in claim 33 including means coupled to an end effector at a working end of said quill comprising a modular fifth axis device driven by a power source inserted in the hollow barrel of said quill, said modular device being moveable in horizontal planes passing through said third and fourth axes to provide an added degree of freedom for operations of said robotic manipulator, said modular fifth axis device comprising an output yoke movable through said horizontal planes, and means for translating the output of the power source into movement of said yoke.

38. A robotic manipulator as in claim 33 wherein said quill is hollow, and including means for providing movement of an end effector on an end of said quill, in vertical planes incorporating said third axis comprising a modular device including a source of motor power inserted within said quill, means for coupling said modular device to an end effector on said quill and an output yoke of said modular device driven by said motor power source to work a workpiece.

39. A robotic manipulator as in claim 33 including means coupled to an end effector at a working end of said quill comprising a modular fifth axis device driven by a power source inserted in the hollow barrel of said quill, said modular device being moveable in vertical planes incorporating said third and fourth axes to provide an added degree of freedom for operations of said robotic manipulator, said modular fifth axis device comprising an output yoke moveable in said vertical planes, and means for translating the output of the power source into movement of said yoke.

40. A robotic manipulator as in claim 39 wherein said output translating means comprises a rack driven by said power source along said third axis of motion within said quill, and gear means coupled between said rack and said yoke to move said yoke through said vertical planes with vertical movement of said rack.

41. A robotic manipulator as in claim 40 wherein said power source comprises an electric motor coupled to said rack through a drive nut to move said rack along said third axis.

* * * * *